United States Patent
Eller et al.

[11] Patent Number: 5,889,860
[45] Date of Patent: Mar. 30, 1999

[54] ENCRYPTION SYSTEM WITH TRANSACTION CODED DECRYPTION KEY

[75] Inventors: Marlin J. Eller; Brent R. Mills, both of Seattle, Wash.

[73] Assignee: Sunhawk Corporation, Inc., Seattle, Wash.

[21] Appl. No.: 744,430

[22] Filed: Nov. 8, 1996

[51] Int. Cl.⁶ ............................................. H04L 9/00
[52] U.S. Cl. .................................. 380/4; 380/21; 380/49; 395/188.01; 705/26
[58] Field of Search .................................. 380/4, 21, 49; 395/186, 187.01, 188.01; 705/26, 27

[56] References Cited

U.S. PATENT DOCUMENTS

| | | | |
|---|---|---|---|
| 4,458,315 | 7/1984 | Uchenick | 380/4 |
| 4,528,643 | 7/1985 | Freeny, Jr. | 364/900 |
| 4,535,356 | 8/1985 | Nakagawa et al. | 358/145 |
| 4,710,921 | 12/1987 | Ishidoh et al. | 370/110.1 |
| 4,789,863 | 12/1988 | Bush | 340/825.35 |
| 4,790,010 | 12/1988 | Sgrignoli | 380/10 |
| 4,794,644 | 12/1988 | Philip et al. | 380/23 |
| 4,956,768 | 9/1990 | Sidi et al. | 364/200 |
| 4,958,551 | 9/1990 | Lui | 84/462 |
| 4,991,207 | 2/1991 | Shiraishi et al. | 380/9 |
| 5,010,571 | 4/1991 | Katznelson | 380/4 |
| 5,086,475 | 2/1992 | Kutaragi et al. | 381/36 |
| 5,146,833 | 9/1992 | Lui | 84/462 |
| 5,191,611 | 3/1993 | Lang | 380/25 |
| 5,208,665 | 5/1993 | McCalley et al. | 358/86 |
| 5,239,540 | 8/1993 | Rovira et al. | 370/77 |
| 5,252,775 | 10/1993 | Urano | 84/645 |
| 5,333,155 | 7/1994 | Dambacher | 375/122 |
| 5,337,357 | 8/1994 | Chou et al. | 380/4 |
| 5,400,403 | 3/1995 | Fahn et al. | 380/21 |
| 5,406,558 | 4/1995 | Rovira et al. | 370/77 |
| 5,509,070 | 4/1996 | Schull | 380/4 |
| 5,524,051 | 6/1996 | Ryan | 380/9 |
| 5,561,849 | 10/1996 | Mankovitz | 455/45 |
| 5,586,186 | 12/1996 | Yuval et al. | 380/30 |
| 5,636,276 | 6/1997 | Brugger | 380/4 |
| 5,661,799 | 8/1997 | Nagel | 380/4 |

FOREIGN PATENT DOCUMENTS

| | | | |
|---|---|---|---|
| 0 416 455 A2 | 3/1991 | European Pat. Off. | H04N 7/16 |
| WO 94/11858 | 5/1994 | WIPO | G10H 1/36 |

*Primary Examiner*—Gail O. Hayes
*Assistant Examiner*—Pinchus M. Laufer
*Attorney, Agent, or Firm*—Seed & Berry LLP

[57] ABSTRACT

The encryption secured computer system (10) includes a server (12) that communicates with clients (14–20) across a public network (21) using a novel transaction coded decryption key technology that discourages wrongful redistribution of protected information such as digital musical scores, and allows for tracking of infringing activity. In one implementation, the server (12) distributes access software and partially encrypted musical scores to clients upon request. A client can sample the partially encrypted scores prior to consummating a transaction. When a score is selected, the client enters payment information and is assigned a password that is specific to the client and transaction. The password functions as a decryption key to enable use of the musical score by the client employing the access software. Any subsequent wrongful redistribution of the musical score together with the decryption password can be traced due to client identifying information encoded into the password.

15 Claims, 9 Drawing Sheets

MUSIC DISTRIBUTION MONITORING
SYSTEM (46) OVERVIEW

ENCRYPTION SYSTEM WITH TRANSACTION CODED DECRYPTION KEY

FIELD OF THE INVENTION

The present invention relates generally to monitoring the distribution of information that is accessible through a public network and, in particular, to a method and system for using key-based encryption to inhibit and track unauthorized distribution by a key holder. The invention has particular application with regard to the commercial distribution of copyrighted works or other proprietary subject matter over a public network.

BACKGROUND OF THE INVENTION

The advent of widely available public computer networks, and particularly public networks capable of supporting multimedia functions such as the Internet, presents a great opportunity for consumers and content providers such as music publishers. Such networks afford content providers increased access to an ever growing market. Consumers benefit from improved access to information and greater convenience. Moreover, in some cases, the digital nature of the information received over a network is preferable to more conventional modes such as printed media. For example, digital sheet music can be printed to replicate its printed media counterpart. Additionally, the digital sheet music can be directly processed by audio and video playback programs, as well as by a variety of digital musical instruments and equipment such as Musical Instrument Digital Interface (MIDI) devices.

Despite this potential, content providers have been reluctant to embrace this market in many cases. One reason for this reluctance has been a perceived threat that access to proprietary subject matter such as copyrighted music over a public network will erode ownership interests in and revenues from such subject matter. The concern is that unscrupulous persons will wrongfully access such subject matter or that authorized users, having rightfully accessed the subject matter, will thereafter distribute the subject matter in contravention of the content providers' rights. Although such possibilities exist in connection with other modes of distribution, public network distribution is thought by some to present peculiar dangers due to the ease with which widespread distribution can be accomplished, e.g., via bulletin boards and the like.

Indeed, conventional computer security systems developed to control access to restricted access data are not well-suited to address these concerns of content providers. For example, access password systems are somewhat effective in limiting access to designated information, but do not afford protection once the information is transmitted from the server system to a public network. Encryption systems have been devised to prevent use of information that is wrongfully intercepted as a result of transmission over a network. In this regard, in key-based encryption systems, authorized clients are provided with a decryption key. The protected information is then transmitted in encrypted form to prevent use by any intercepting party. The authorized client receives the encrypted information and uses the decryption key to decrypt the information. Unfortunately, such encryption systems generally do not provide adequate safeguards to discourage the authorized clients from subsequently redistributing the protected information.

SUMMARY OF THE INVENTION

The present invention is directed to a method and system for controlling access to protected information from a server, as well as discouraging and tracking subsequent redistribution of such information after it has been transmitted from the server. The invention facilitates commercial distribution of proprietary subject matter through public or open networks by providing improved protection of proprietary rights and increasing the likelihood that infringing activity will be corrected. Moreover, the invention provides increased marketing flexibility by allowing for limited, multiple-use authorization and pre-purchase sampling of copyrighted works or other confidential subject matter. The invention also provides a novel, encryption on-demand capability which, it is believed, has not been feasible in connection with physical storage media such as CD-ROM and magnetic storage media.

According to one aspect of the present invention, a method and corresponding system is provided for monitoring distribution of information accessible over a public network on a client-specific basis. The method includes the steps of: establishing a database of information at a server; encrypting at least a portion of the information using a key-based encryption system; in connection with a request by a client, assigning a client-specific key to the client; and transmitting the key to the client. The client-specific key includes some indicia that can be used to identify the client, thereby allowing for monitoring of information use on a client-specific basis.

The database can include various types of information, for example, digital sheet music, literary or artistic works, software programs, or other subject matter transmittable in digital form. Any identifying information can be coded into the key for client identification. Examples include: personal or financial data provided by the client; address information for the clients' computer or web site; account numbers or serial numbers; other information for identifying the computer used by the client; and abbreviated or encoded versions of any of the above. Conveniently, such information can be stored in a separate client database and indexed to the key. Preferably, the decryption system requires entry of the key each time the protected information is used (i.e., the system does not store the information in decrypted form) and appends the client identifying information to any redistributed digital or hard copies of the information. In this manner, the client is discouraged from redistributing the protected information because the key is required to use the information in its original digital form, and distribution of the key or an identified hard copy may involve disclosure of sensitive information or otherwise create a traceable record of the client's infringing activity.

According to another aspect of the present invention, a method and corresponding system is provided for enabling transaction-specific access authorization with respect to protected information. The method involves the use of a key-based encryption system, such as generally discussed above, where decryption keys are assigned on a transaction-by-transaction basis. That is, decryption keys are assigned on demand in connection with a transaction involving communication of the protected information from the server to a client. For example, the transaction may involve the purchase of a copy of sheet music, a digital musical score or other protected information, or it may involve paying a license fee to use such information a designated number of times, for a designated duration, or during a designated license term. The key can include information sufficient to identify the subject information and/or the client. The invention thereby allows for transaction-specific authorization and increased marketing/distribution possibilities.

According to a further aspect of the present invention, partially encrypted information is transmitted prior to providing a decryption key so as to allow for sampling of the information before a transaction is consummated. In particular, the associated method involves establishing a database of information at a network server, encrypting a portion of the information and receiving an access request. Upon receiving an access request, a selected portion of the information is transmitted in partially encrypted form and, thereafter, a decryption key is transmitted to the client. By way of example, the partially encrypted information can be sheet music where only the first page of a score is unencrypted for viewing. The client can thereby browse through a selection of scores prior to making a purchasing decision, authorizing payment and, in response, receiving a decryption key.

According to a still further aspect of the present invention, a method and corresponding system is provided for enabling post-transmission monitoring of information use by a client. The method includes the steps of: receiving encrypted information and storing the information in memory in its encrypted form; receiving a decryption key and storing the key in memory separate from the encrypted information, for example, in a cache; identifying a request by a client to access the information; in response to the request, retrieving the encrypted information and key from memory and, thereafter, decrypting the information; and outputting the information for use by the client. The method can be implemented, for example, by playback/display software running on a client computer. The software can be programmed for limiting access to the protected information according to transaction parameters, e.g., limiting access to the scope of a license purchased by the client. The access request can be an "open file," "display," or "print" message or the like.

In a preferred implementation, the protected information is never saved in its decrypted form but, rather, is only decrypted on a just-in-time basis when the corresponding file(s) is opened for use. Accordingly, redistribution of the information in its decrypted form is discouraged or practically prevented. Moreover, in order to permit third-party use of the information, redistribution of the information in its encrypted form will also require distribution of the decryption key, which may be an unattractive option for the client.

The present invention thus allows for monitoring access to protected information on a server and subsequent use or redistribution by a client. Additionally, the invention allows for tracking of any unauthorized redistribution and thus facilitates enforcement of server rights. The invention also provides for increased marketing/distribution options and novel on-demand decryption key coding. By virtue of these and other advantages, the invention promotes distribution of proprietary subject matter over public networks to the mutual benefit of consumers and content providers.

BRIEF DESCRIPTION OF THE DRAWINGS

For a more complete understanding of the present invention and further advantages thereof, reference is now made to the following detailed description, taken in conjunction with the drawings, in which.

DETAILED DESCRIPTION OF THE INVENTION

The distribution monitoring system of the present invention is useful in a variety of applications where it is desired to monitor the distribution of proprietary subject matter over a public network. In the following description, the invention is set forth in the context of monitoring distribution of digital musical scores over a network. It will be appreciated that this particular application is set forth for the purpose of illustrating the invention, and various aspects of the invention have broader application as defined by the claims below.

Figure 1:
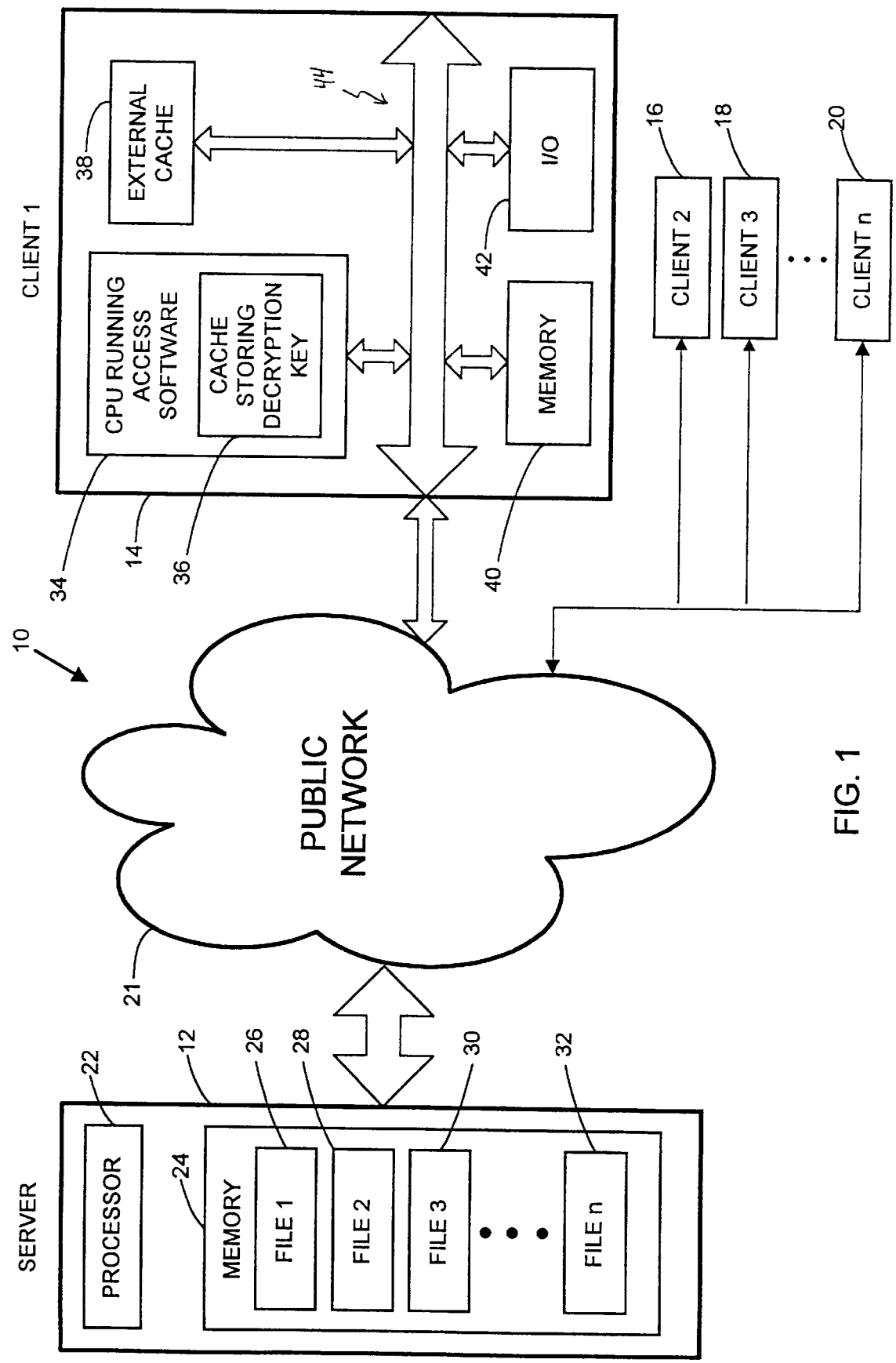
FIG. 1 is a schematic diagram of a computer system in accordance with the present invention.

FIG. 1 illustrates an encryption secured computer system 10 according to the present invention. The computer system 10 includes a server 12 that can communicate with clients 14–20 across a public network 21 such as the Internet. In the case of the Internet, the server 12 can be accessed via the Netscape 2.01 or Microsoft Internet Explorer 3.0, or higher browsers. The server 12 generally includes a processor 22 and a library or database of digital musical scores stored in a memory 24 as files 26–32. As discussed in detail below, the server 12 is operative for receiving access requests from clients 14–20, assigning decryption keys or passwords and transmitting an accessing program and selected scores to the clients 14–20 over network 21. A number of other functions relating to receiving payment, indexing and storing encoded decryption passwords and the like are also performed by server 12.

For present purposes, the clients 14–20 may be considered as being functionally equivalent. Details of only one of the clients 14 are shown in FIG. 1. Generally, the client 14 includes a central processing unit (CPU) 34, an internal cache 36 and/or external cache 38, memory 40 and input/output (I/O) hardware 42, all interconnected via data bus 44. The CPU, which may include any suitable microprocessor, is operative for downloading and running the accessing program, accessing memory 40 and caches 36 and 38, and communicating with I/O hardware 42. In the illustrated embodiment, the CPU 34 also includes a built-in, internal cache for storing the decryption key used to decrypt downloaded musical scores. Generally, cache 36 is an area of extremely fast Random Access Memory (RAM) for storing frequently used or time critical data so as to allow for faster operation. The cache 36 can be accessed more rapidly than memory 40. Alternatively, the decrypting key can be stored in an external cache 38, which may comprise a RAM chip located on the computer motherboard. Memory 40, which is separate from caches 36 and 38, may include computer memory as well as the storage of floppy disks, CD-ROM drives and hard drives. The I/O hardware 42 can include a number of types of devices including a mouse, keyboard or other user input device; a viewing monitor; a printer; or a MIDI device.

Figure 2:
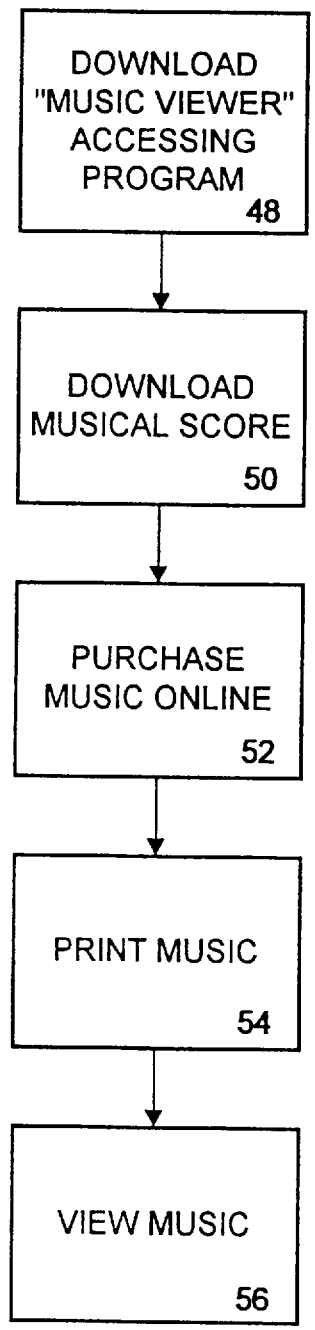
FIG. 2 is a chart providing a functional overview of the distribution monitoring system of the present invention.

FIG. 2 provides a functional overview of a music distribution monitoring system 46 used in connection with the computer system 10 of FIG. 1. As shown in FIG. 2, the monitoring system 46 can be broken down into a number of functions that are executed by logic on the server and/or a client. The functions of the illustrated system 46 include: downloading (48) a music accessing program, in this case designated the "Music Viewer," for use by a client in accessing music files stored on the server; downloading (50) a selected musical score from the server; purchasing (52) music on-line (and thereby obtaining an access license and encoded decryption key); printing (54) and/or viewing (56) the music and music encryption/decryption. It will be appreciated that the music may also be reproduced from digital information using a MIDI device or the like. Each of these functions is discussed in turn below.

Figure 3:
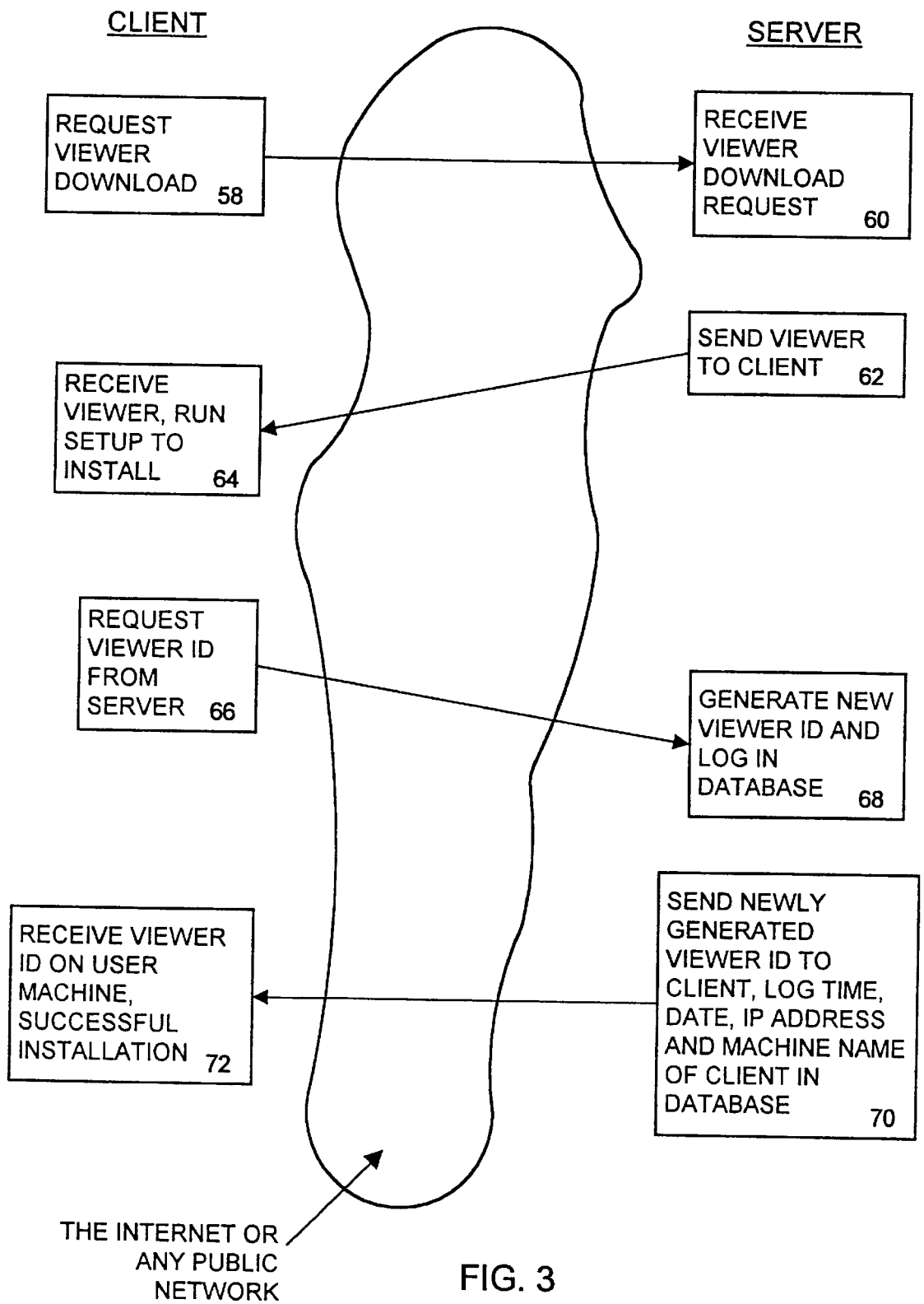
FIG. 3 is a diagram of the Music Viewer download function of the system of FIG. 2.

FIG. 3 illustrates the Music Viewer download function of one implementation of the present invention. After communication between the server and client has been established through the network, the client initiates the download function by requesting (58) the server to download the program. This request can be entered by following appropriate prompts from the server site. The server receives (60) the download request and sends (62) the Viewer software package to the client. Upon receiving (64) the software package, the client runs the setup code to install the Music Viewer software. In order to access musical scores stored in the server library in the illustrated system, the client is assigned a unique Viewer identification code. Accordingly, the client is prompted to request (66) a Viewer ID as part of the download procedure. In response to the ID request, the server generates (68) a Viewer ID and logs the ID in a Viewer database. The server then sends (70) the newly generated Viewer ID to the client and logs the transmission time and date, the Internet Protocol (IP) address (or similar information for other networks) of the client, and the client's machine name or type (as entered by the client user or determined from a transmission header or the like). The client then receives (72) the assigned Viewer ID and a successful installation is thus completed.

Figure 4:
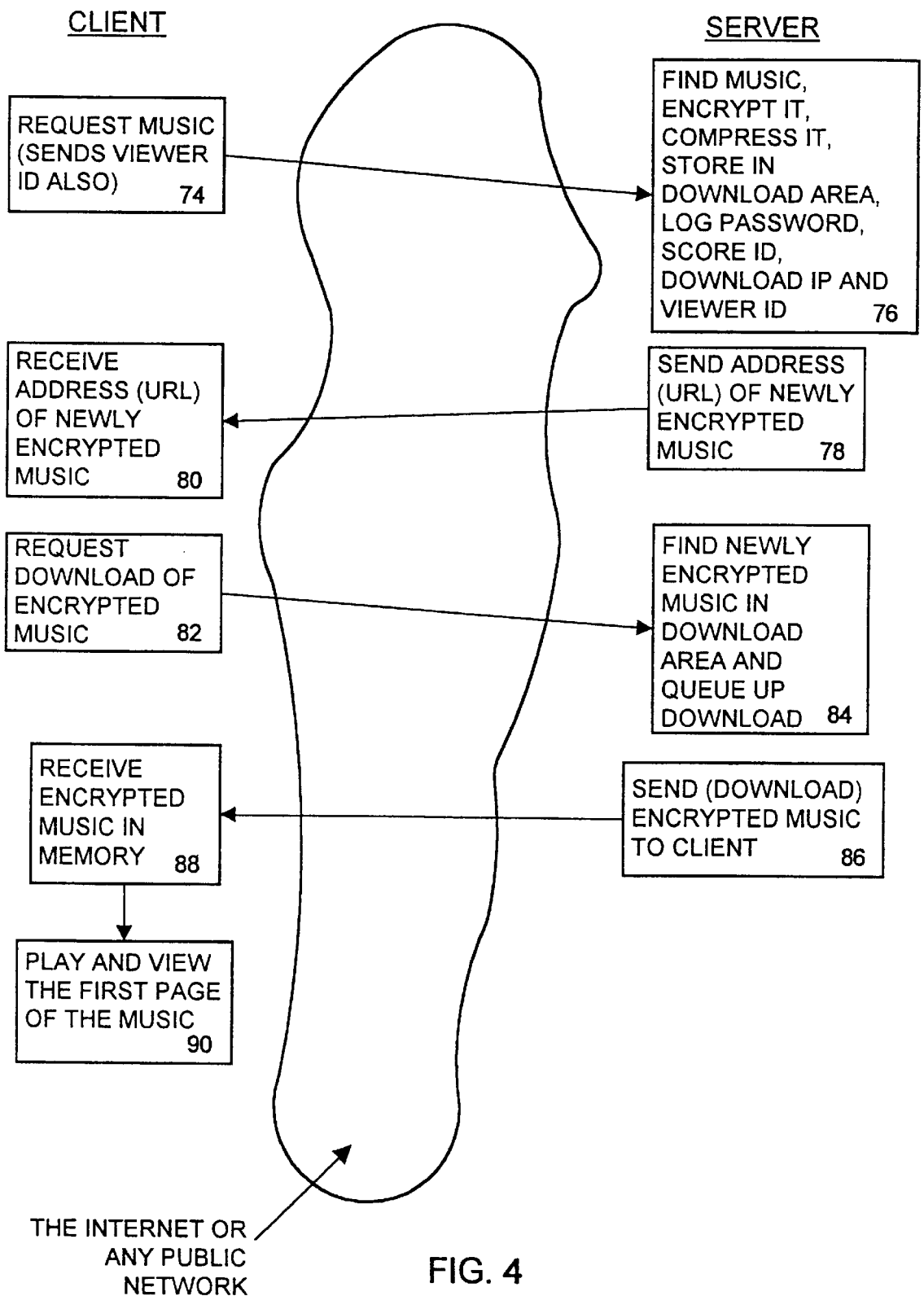
FIG. 4 is a diagram of the music download function of the system of FIG. 2.

The system of the illustrated embodiment allows the client user to browse through the music library and view a selected portion, e.g., the first page, of musical scores prior to consummating a transaction by purchasing a music copy or paying a license fee. FIG. 4 illustrates the associated pre-purchase music download function. The function is initiated when the client selects a score to sample and requests (74) the music from the server. In this regard, the score may be selected from a list of titles by scrolling through the library and clicking on a selected title, by using a search function to call a title, or by any other appropriate means. The Viewer ID is also sent to the server at this time. Upon receiving the request, the server finds (76) the requested musical score, compresses and encrypts (or partially encrypts) the score as will be described below, and stores the encrypted score in the download area. In addition, the server assigns and logs a decryption key that is unique to the client and also logs an identification code for the score, the download IP, and the Viewer ID for the transmission. For example, the key can be a password composed of two 32 bit numbers where one of the numbers is an index to identify the client in a client database and the other number is random, or encoded with additional information as desired. By indexing the key or password to the client database in this manner, the password can be used to identify the client, look up license or account information and otherwise monitor distribution on a client-specific and transaction-specific basis.

The server then sends (78) the client the Uniform Resource Locator (URL) address of the newly encrypted music. Upon receiving (80) the URL, the client can request (82) a download of the file or files containing the encrypted music. The server then finds (84) the encrypted music in the download area, queues up the music, and downloads (86) the music to the client. The client receives (88) the encrypted music and stores the music in memory, e.g., computer memory, hard drive storage, etc. At this point in the illustrated implementation, i.e., prior to purchase, only the first page of the score is not encrypted. Accordingly, the client user can play and view (90) the first page of the music to verify that the downloaded score is the score desired by the user and to otherwise evaluate purchasing options.

Figure 5:
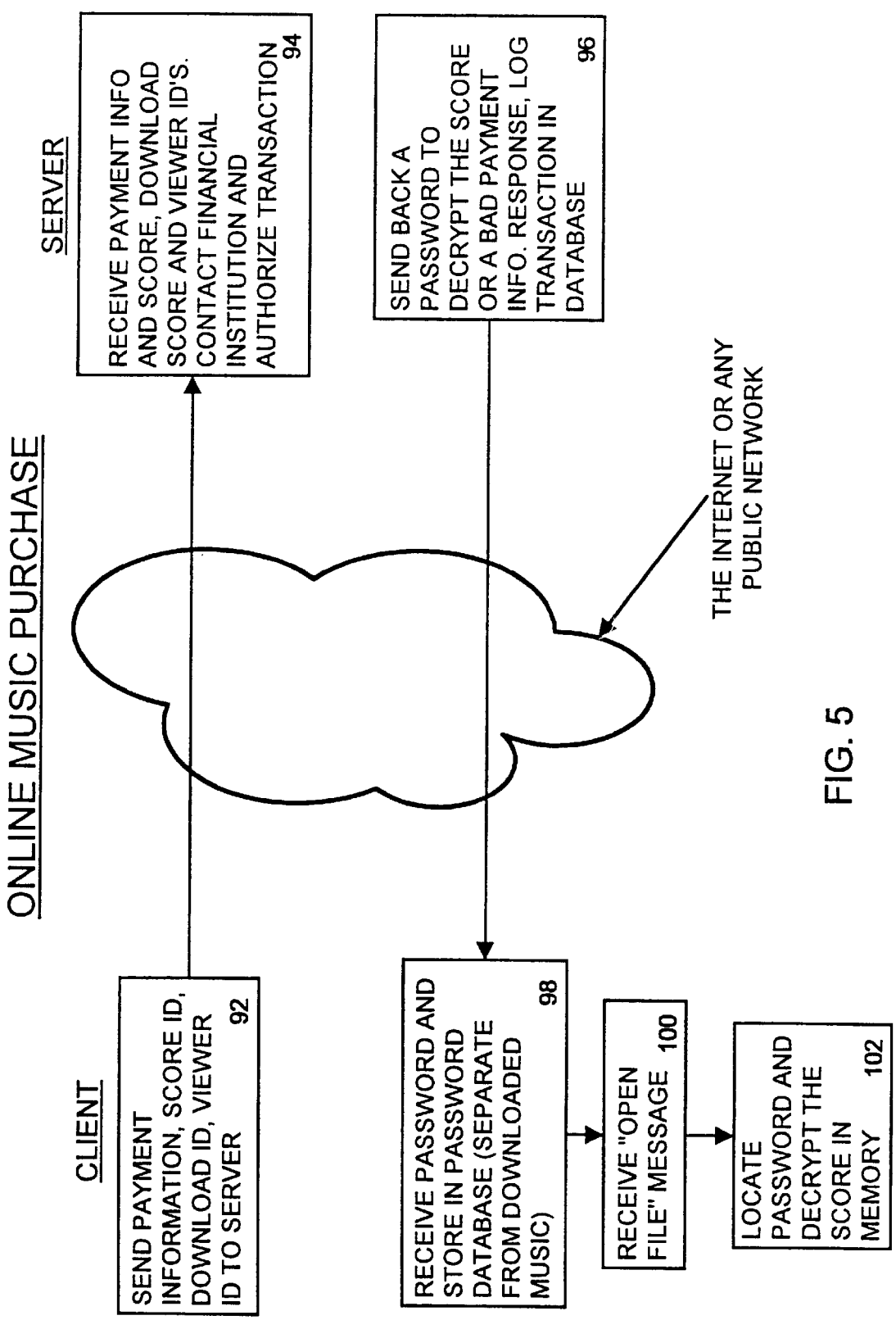
FIG. 5 is a diagram of the on-line music purchase function of the system of FIG. 2.

After thus browsing through the music library and sampling one or more scores, the client user may decide to make an on-line music purchase, e.g., to purchase a copy of the music in sheet music form, or to pay a license fee to print copies, view the music in its entirety, play back the music on the client's I/O hardware, or otherwise use the music. Such a license may be for single use, multiple use, unlimited use during a license term, etc. FIG. 5 illustrates the on-line purchase function. The function is initiated by the client by sending (92) payment information (for example, a credit card account number and expiration date, or the number of a previously established, pre-paid or unpre-paid account with the server institution), the score ID, the download IP, Viewer ID and/or any other information to the server. Some or all of this information may have already been transmitted to the server in connection with browsing the music library and would not necessarily have to be re-transmitted. The exchange of personal and financial information can be encrypted using standard public key encryption as provided, for example, in the Secure Sockets layer of the browser.

Upon receiving (94) this information, the server downloads the score and Viewer ID, and contacts the client user's financial institution or a credit card approval service, looks up balance information, or otherwise obtains authorization for the transaction. Based on the results of this authorization inquiry, the server sends back (96) to the client either a bad payment message (e.g, "payment declined"), or the server sends a decryption password and logs the password and other transaction information in its database. By operation of the Music Viewer software, the client then receives (98) the password and stores the password in a password database separate from the downloaded music. It will thus be difficult for a client user to improperly redistribute music because the user will generally not be aware that a decryption password has been stored in its system, nor will the user know how to access the password. In operation, the Music Viewer software monitors client messages until it receives (100) an "open file" message indicating that the user desires to print, playback or otherwise use the music. At this time, the Music Viewer locates (102) the password, which may be stored in a client cache for speed of operation. The Music Viewer can also retrieve license information relevant to the client's access request and, in appropriate cases, increment the client use count under the license as discussed below. If the client has remaining uses under a license, the Music Viewer decrypts the score in memory. It will be noted that the music is never saved in decrypted form, but is only decrypted just-in-time for a requested use, thereby discouraging improper redistribution.

Figure 6:
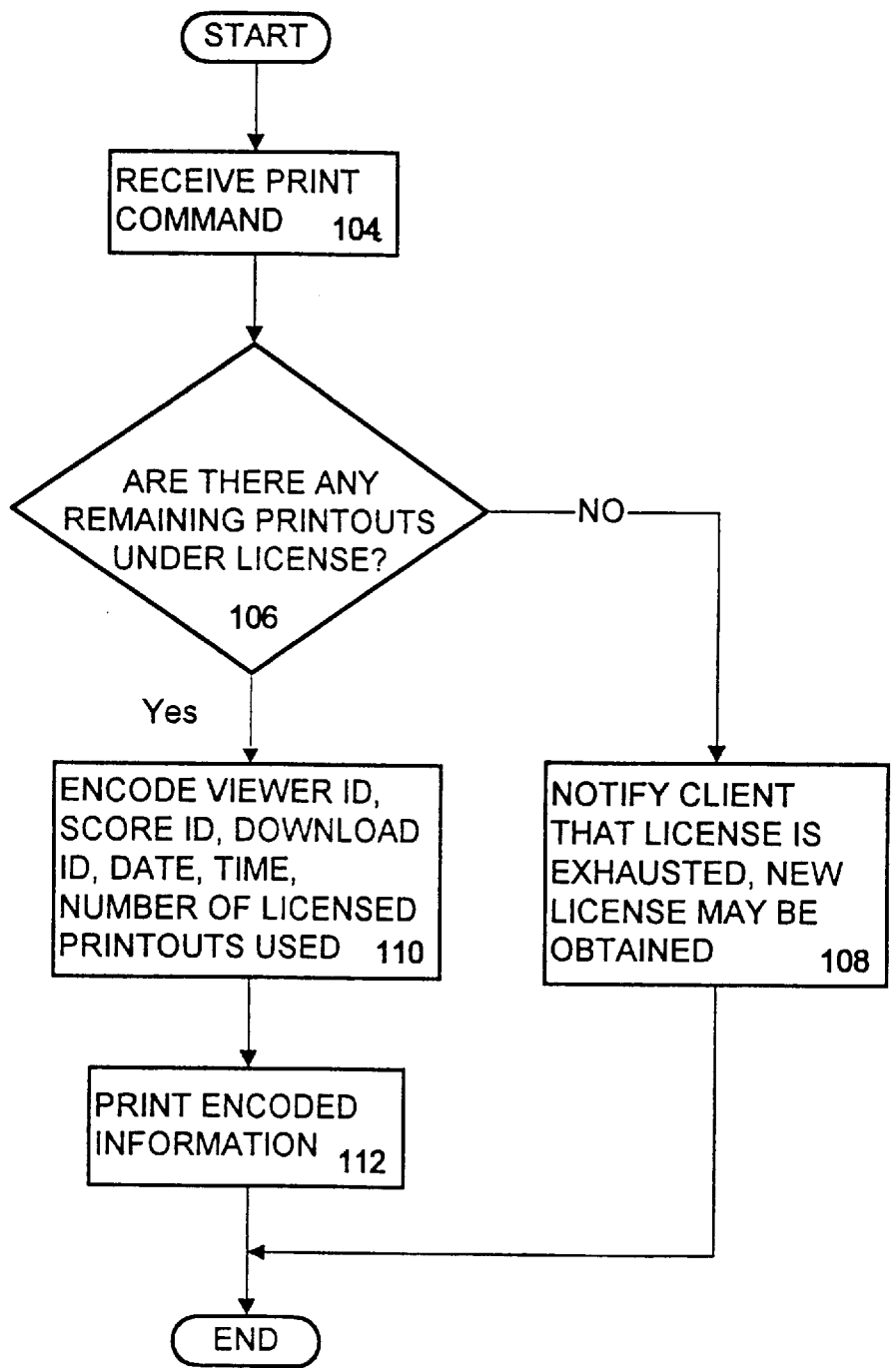
FIG. 6 is a flow chart of the music printing function of the system of FIG. 2.

FIG. 6 illustrates a music printing function according to the invention. As previously noted, after downloading music and a password, the Music Viewer monitors client messages to identify access requests. When a print command is received (104), the Music Viewer consults its client database to determine (106) whether there are any remaining printouts allowed under the license previously purchased by the client user. In this regard, the client user may have payed a single use or multi-use license fee. If the license has been exhausted, the client is notified (108) accordingly, and information may be provided concerning options for paying a further license fee. Otherwise, the Music Viewer encodes (110) various information regarding the transaction in the user database, e.g., Viewer ID, score ID, download ID, date, time and number of licensed printouts used. This information can be encoded, for example, in a base 72 number string in an appropriate format, and then printed (112) on the copy (e.g., next to the copyright notice). Similarly, this same identification information can be written into a comment statement of a MIDI file to tag MIDI extractions. This information allows for proper incrementing of a multi-use license and also allows for subsequent tracking of any improper redistribution of the printed copy. In this regard, if a printed copy of the score or MIDI file is found, the associated transaction and client can be readily decoded.

Figure 7:
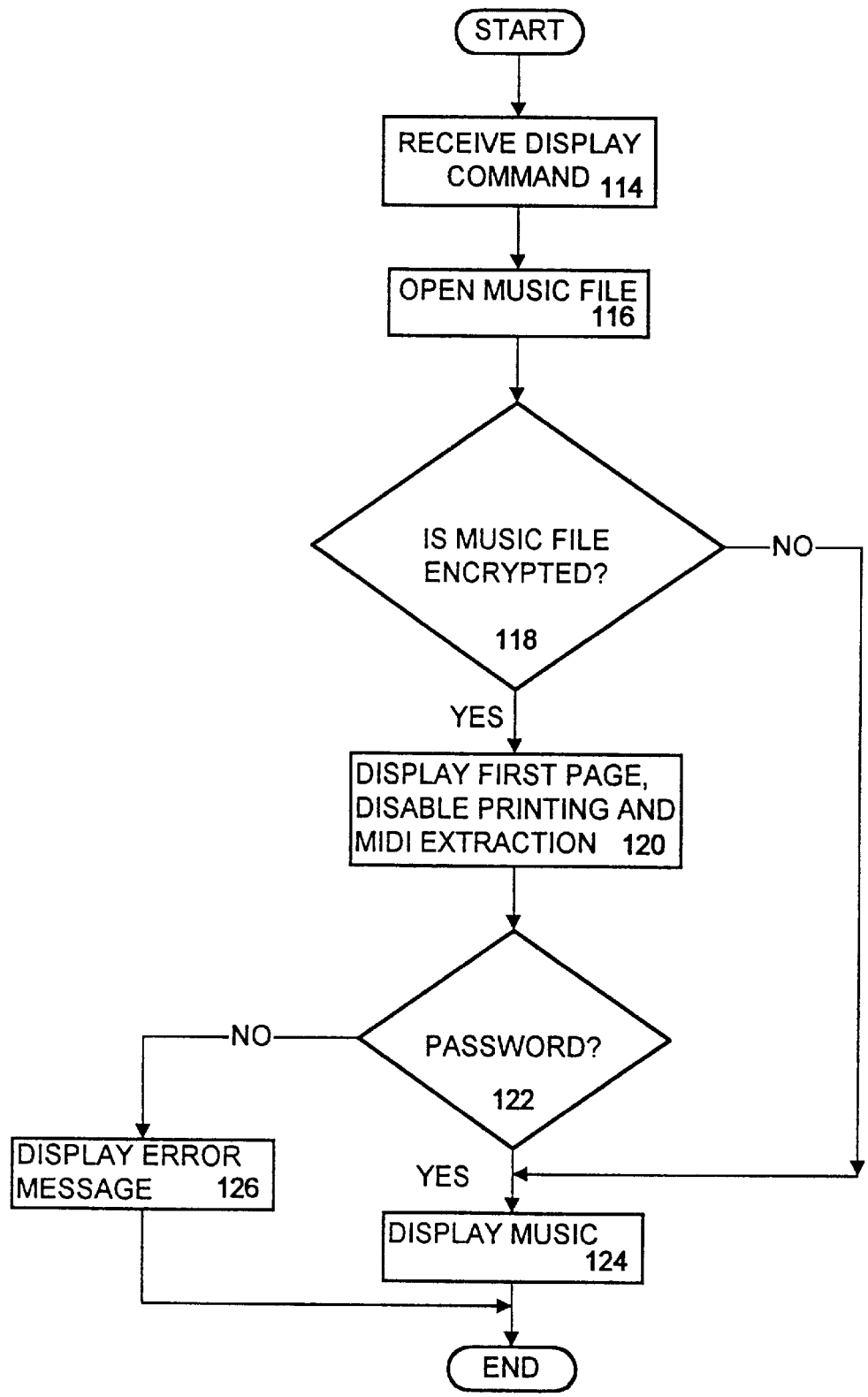
FIG. 7 is a flow chart of the music viewing function of the system of FIG. 2.

Instead of, or in addition to printing the music, the on-line user may desire to view the music on a monitor. For example, the music may be viewed in conjunction with playing back the music for enhanced enjoyment, or the music may be displayed to facilitate selection of playback options involving tempo, instrumentation and the like. FIG. 7 illustrates the associated music viewing function. Upon receiving (114) a display command, the Music Viewer opens (116) the requested music file and determines (118) whether the file is encrypted. If the music is not encrypted, e.g., because it has been decrypted in a previous step or is public domain music, the music can be directly displayed (124). However, in the case where the music is encrypted with the exception of the first page for sampling, the Music Viewer proceeds to display (120) the first page and disable printing or MIDI extraction. If the client user then attempts to display the remainder of the music, the Music Viewer first determines (122) whether a valid and unexpired password has been assigned to the user. If so, the music is decrypted and displayed (124). Otherwise, an error message is displayed (126).

Figure 8:
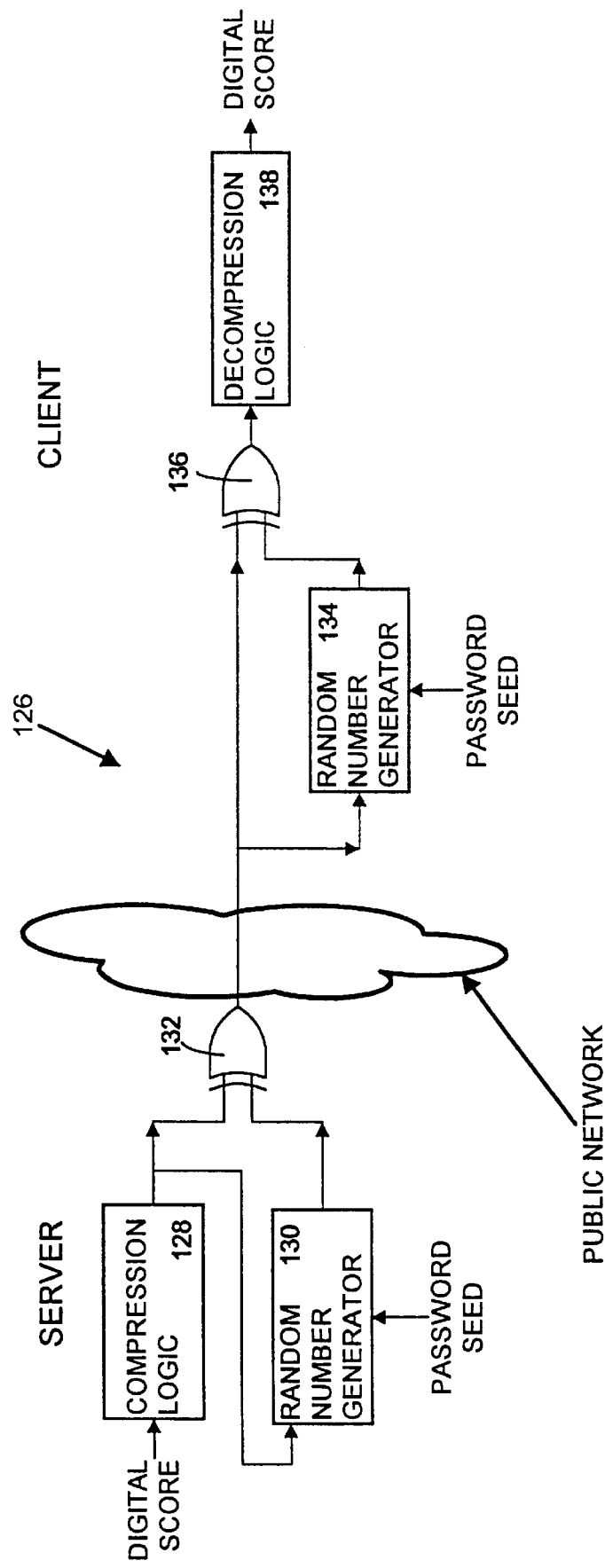
FIG. 8 is a schematic diagram of the encryption/decryption components of the system of FIG. 2.
Figure 9:
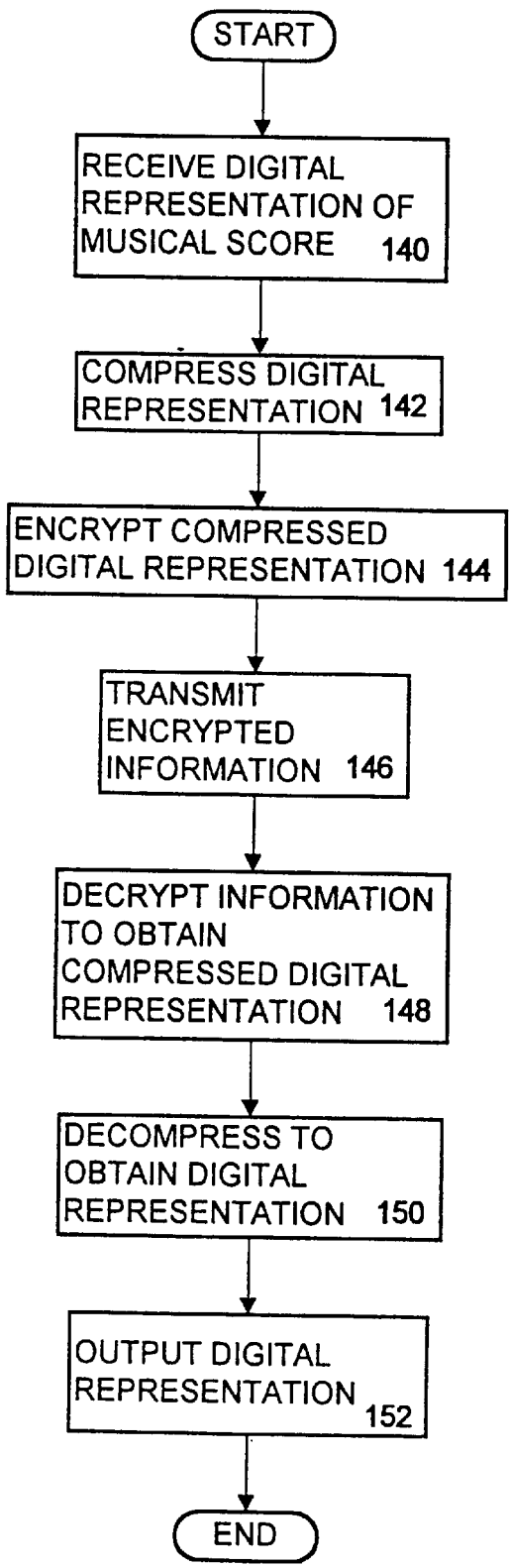
FIG. 9 is a flow chart of the encryption/decryption function of the system of FIG. 2.

FIGS. 8 and 9 illustrate one implementation of the encryption/decryption function of the music distribution monitoring system. It will be appreciated that any suitable technique, including using a public key encryption/decryption algorithm, can be employed as the base level encryption/decryption technology in accordance with the present invention. In addition, the base level encryption/decryption technology can be implemented in hardware and/or software logic. The following description illustrates one exemplary implementation. Referring first to FIG. 8, the encryption/decryption components are schematically shown. On the server side, the encryption/decryption subsystem 126 includes compression logic 128, random number generator 130 and exclusive OR (XOR) gate 132. The compression logic, which can be a conventional data compression software program or a data compression hardware package, receives the raw digital musical score and compresses the score for transmission. It will be appreciated that this compression, in addition to improving transmission speed, enhances subsequent encryption as the compressed and encrypted data will be especially difficult for an intercepting party to decipher. The random number generator 130 can include one or more conventional random number generating programs. In this regard, two such programs can be employed to handle the two 32 bit words of the decryption password. The random number generator 130 implements an algorithm for generating a determined series of values starting from an initial seed. In the illustrated embodiment, the assigned password is provided to the generator 130 as a seed. The generator 130 also receives an input from the compressed data stream line that triggers the generator 130 such that the generator 130 outputs a bit stream equal in length to and coordinated with the compressed data stream. The generator output and compressed data stream are used as the two inputs into the XOR gate 132 which performs its characteristic disjunctive comparator function. The output from XOR gate 132 is transmitted over the network to the client.

On the client side, the subsystem 126 includes a client-side random number generator 134 and client-side XOR gate 136, each identical to its server-side counterpart. The subsystem 126 further includes decompression logic 138 that is the logical complement of compression logic 128. The random number generator 134 uses the password as a seed, and generates a bit stream of length determined by an input from the encrypted data stream. It will thus be appreciated that the output bit stream from generator 134 will be identical to that of generator 132, this output, and the encrypted data stream, serve as the two inputs into XOR gate 136. The successive operation of the XOR gates 132 and 136 yield an output from XOR gate 136 that is identical to the output from compression logic 128, i.e., a compressed digital music score. This compressed score is decompressed by decompression logic 138 to yield the digital score in uncompressed, decrypted form. It should be noted that the musical score is decrypted as part of the music output process, not prior to saving the score. Additionally, the encryption/decryption process can be successively performed on page-sized chunks in the case of printing, or on appropriately-sized portions of an audio output (e.g., two seconds of the score), in order to allow for display/play-back on an as-ready basis.

The encryption/decryption process is summarized in the flow chart of FIG. 9. The process is initiated, on the server side, by receiving (140), or calling from memory, a digital representation of the musical score. The digital representation is then, in sequence, compressed (142), encrypted (144) and transmitted (146) across the network to the client. On the client side, the signal is first decrypted (148) to obtain a compressed digital representation, and then decompressed (150) to obtain the digital score. The score can then be output (152) as desired by the client user.

The following illustrative example provides the overall operation of the music distribution monitoring system of the present invention. A client accesses the music distribution server at its World Wide Web site using, for example, the Microsoft Internet Explorer 3.0 browser. From the server home page, the user first selects the option for downloading the Music Viewer program. After selecting this option, the user follows the prompts or instructions to install the software and, in the process, enters various requested identification data. The user may then return to the home page and select the music library option to browse the available selections. The user can then scroll through the available selections to identify a score of interest, for example, "Mozart's Sonata Number 1r." In order to verify that this is the piece that the user has in mind, the user may download the score for sampling. The Music Viewer software stores the partially encrypted digital score and will allow the first page of the score (which is transmitted in unencrypted form) to be displayed on the client monitor and played back.

After one or more scores are thus sampled, the user may decide that he desires to print, view or otherwise use a digital score and that he therefore desires to purchase a copy of or pay a license fee for the score. The user can then select a purchase function and a menu of purchase options will be provided, e.g., single print license, multi-print license, unlimited viewing license for a given license term, etc. The user selects the desired option, responds to a series of prompts concerning identification information and payment information, e.g., by entering a credit card number and personal information. If payment is approved, the user will be assigned a decryption password that is indexed to the client's identifying information in a client database held by the server. By way of example, the client may pay a license fee for ten printouts. In the same or subsequent sessions, the client can request a printout under the license. The system will keep track of the number of printouts used and allow printing only so long as the license is exhausted. Whenever the user prints out a copy of the score, an encoded string of characters is printed next to the copyright notice.

An unscrupulous user may attempt to redistribute the music with disregard for the server/copyright holder's rights. Having the downloaded music file on his system, the user may attempt to redistribute the music electronically. However, having thus attempted to wrongfully redistribute the music, the user will discover that the redistributed information cannot be used because it is encrypted. Such a user may attempt to break the encryption code and may even ultimately surmise that a key has been stored in the client's memory somewhere separate from the music file. In the unlikely event that the user should succeed in redistributing the music together with the password in useable form, the infringing user will have unwittingly left a record of his infringing activity in the form of the personal information that can be derived from the client/transaction encoded password. Similarly, redistribution of printed copies or MIDI files will provide a record due to the coded character string included with the copyright notice or in comment statements. In any event, the coded information facilitates enforcement and thus discourages infringement.

While various embodiments and applications of the present invention have been described in detail, it is apparent that further modifications and adaptations of the invention will occur to those skilled in the art. However, it is to be expressly understood that such modifications and adaptations are within the spirit and scope of the present invention.

We claim:

1. A method for use in monitoring distribution of copies of information items accessible through a public network to a plurality of network clients, said information items included in a database at a server of said public network, comprising the steps of:

for each request for an information item by a network client of the plurality of network clients;

assigning a password to the network client for uniquely encrypting and decrypting the information item, the password including an identifier for identifying the client;

uniquely encrypting at least a portion of said information item using a key-based encryption system and the password to produce a uniquely encrypted information portion, wherein said key-based encryption system requires entry of the password to decrypt said uniquely encrypted information portion;

transmitting the uniquely encrypted information portion to the network client; and transmitting said password to the network client, wherein said password can be used to monitor distribution of said information item on a client-specific basis, wherein the step of transmitting said uniquely encrypted information portion to said client is prior to said step of transmitting said password.

2. A method as set forth in claim 1 wherein said information item comprises a digital musical score and said step of encrypting at least a portion of said information item comprises retaining a second portion of said digital musical score in an unencrypted form so as to allow for sampling of said digital musical score prior to decryption.

3. A method as set forth in claim 1 wherein said step of assigning said password comprises acquiring identification information regarding said client and encoding said password using said acquired identification information.

4. A method as set forth in claim 3 wherein said password comprises a password that is indexed to a client database including said acquired identification information.

5. A method as set forth in claim 3 wherein said password includes information for identifying client equipment.

6. A method as set forth in claim 3 wherein said password includes information for identifying a client user.

7. A method as set forth in claim 1, further comprising receiving payment/purchase information from the network client before transmitting the password to the network client.

8. A method as set forth in claim 1, further comprising the step of transmitting accessing software to the client, said accessing software being operative for allowing said client to access said information in said database.

9. A method as set forth in claim 8, further comprising the step of employing said accessing software to print an unencrypted copy of said uniquely encrypted information portion.

10. A method as set forth in claim 8 wherein said information item comprises a digital musical representation of a musical score, and said method further comprises the step of employing said accessing software to decrypt the uniquely encrypted information portion and play back said musical score.

11. A method as set forth in claim 8, further comprising the step of displaying said information.

12. A method as set forth in claim 1, further comprising the steps of storing said uniquely encrypted information portion in a first area of memory of the network client and storing said password in a second area of memory of the network client separate from said first area, wherein said uniquely encrypted information portion and said password can be separately accessed.

13. A method as set forth in claim 1, further comprising the steps of storing said uniquely encrypted information portion in a client memory in encrypted form, receiving a request to output said uniquely encrypted information portion, and decrypting said encrypted information in response to said output request.

14. A method as set forth in claim 1, further comprising the step of using said password to track subsequent redistribution of said uniquely encrypted information portion.

15. A method as set forth in claim 1, further comprising the steps of outputting an output copy of said uniquely encrypted information portion and embedding identification information in said output copy, wherein said identification information facilitates tracking of redistribution of said information item.

* * * * *